3,268,976
BROACH FOR CURVED GRAPHITE PASSAGES
Ezra Hollister, deceased, late of Kennewick, Wash., by Robert A. Hollister, Salt Lake City, Utah, and Sharon H. Everitt, Pasco, Wash., executors, assignors to the United States of America as represented by the United States Atomic Energy Commission
Filed July 9, 1964, Ser. No. 381,601
5 Claims. (Cl. 29—95.1)

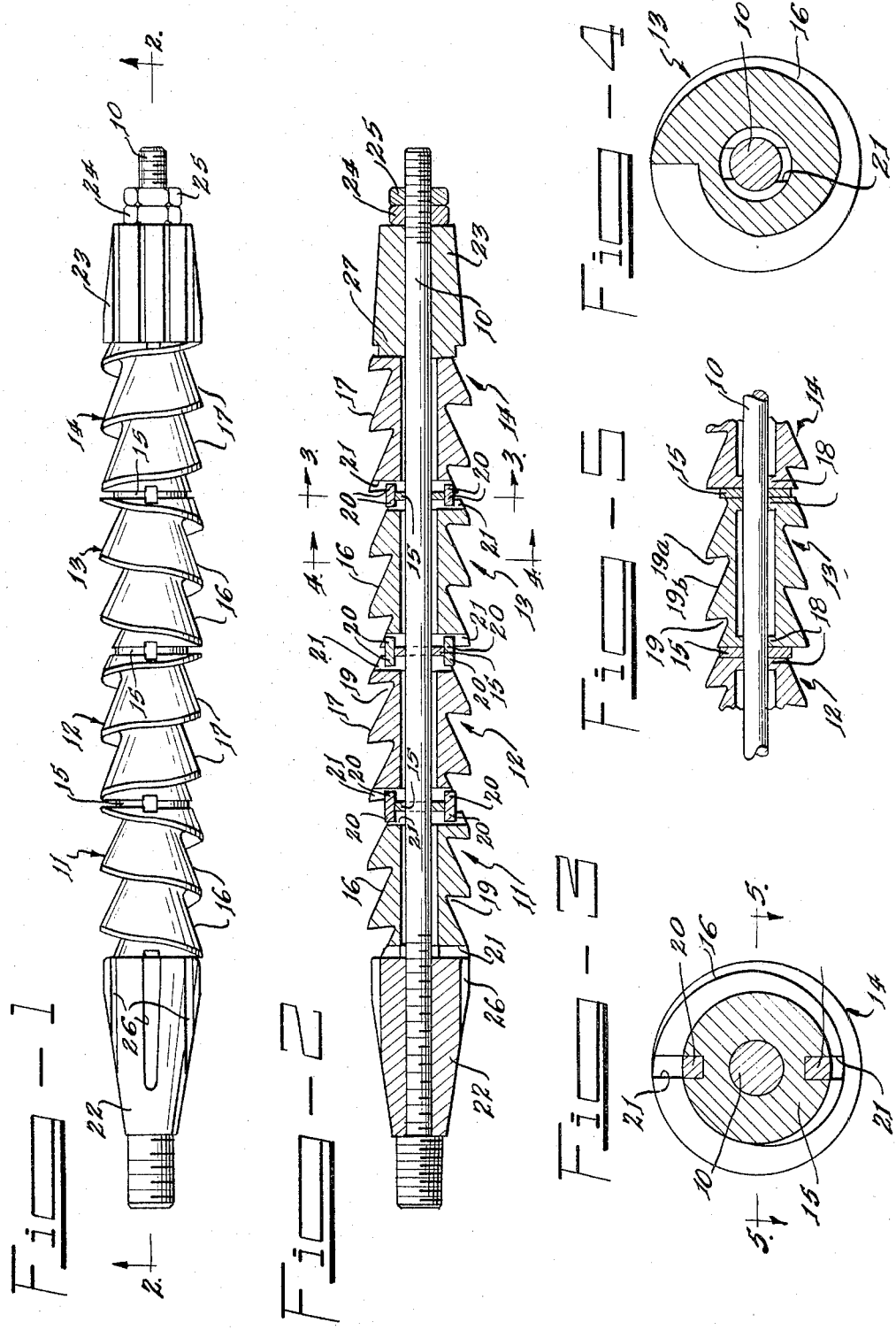

The invention described herein was made in the course of, or under, a contract with the U.S. Atomic Energy Commission.

This invention relates to the sizing of holes formed in graphite. More specifically, the invention relates to a broaching apparatus for sizing a long hole formed in a series of assembled graphite blocks.

FIGS. 37, 38, and 39 and columns 42, 43, and 44 of Fermi et al. Patent 2,708,656, dated May 17, 1955, disclose a nuclear reactor in which there is a number of long holes formed in a pile of graphite to receive coolant tubes containing nuclear-fuel slugs. When coolant tubes damaged in reactor operation are removed, the holes in the graphite blocks vacated thereby must be sized or repaired to receive new coolant tubes. Since any one hole is a series of holes formed in a series of graphite blocks laid end to end and reactor operation may have caused the individual graphite blocks to grow different amounts, the hole may curve or meander through the blocks.

The sizing device of the present invention has the flexibility to accommodate it to a long curved or meandering hole in graphite. The device has spiral cutting edges and so is able to go from one graphite block to another without chattering. The device is formed of several broaching elements on which the spiral cutting edges alternate in direction from one broaching element to the next, and so the sizing device does not rotate as it is sizing a hole.

In the drawings:

FIG. 1 is an elevation of the novel sizing device of the present invention;

FIG. 2 is a longitudinal sectional view taken on the line 2—2 of FIG. 1;

FIG. 3 is a transverse sectional view taken on the line 3—3 of FIG. 2;

FIG. 4 is a transverse sectional view taken on the line 4—4 of FIG. 2; and

FIG. 5 is a fragmentary longitudinal section taken on the line 5—5 of FIG. 3.

As shown in FIGS. 1 and 2, the sizing device of the present invention comprises a slender shaft 10, a row of broaching elements 11, 12, 13, and 14 loosely fitting the shaft 10, and a plurality of locking washers 15 located on the shaft between the broaching elements for keying the latter against rotation with respect to one another.

Each of alternate broaching elements 11 and 13 has a single spiral cutting portion 16 extending in one direction, whereas each of alternate broaching elements 12 and 14 has a single spiral cutting portion 17 extending in the opposite direction. This arrangement keeps the broaching elements from rotating when the device is broaching a hole. Each of cutting portions 16 and 17 has a relatively small angle, for example, 10°, with respect to a plane perpendicular to the axis of the shaft 10, and so the cutting action is good.

Each of the broaching elements 11, 12, 13, and 14 has a loose fit on the shaft 10 except at the end portions 18, which have a fairly good fit with the shaft, as shown in FIG. 5. The loose fit and the slenderness of the shaft 10 give the present sizing device the needed flexibility to size a meandering or curved hole in graphite blocks.

A gullet 19 of good size to accommodate a large amount of graphite chips removed by the broaching elements 11–14 is associated with each of the cutting portions 16 and 17, because a front face 19a of each cutting portion is undercut at about 5° to the plane perpendicular to the axis of the shaft 10 and a rear face 19b has an angle of about 65° to the same plane.

Each locking washer 15 has two sets of diametrally opposed keys 20, one set projecting parallel to the shaft 10 into slots 21 in one of a pair of juxtaposed broaching elements 11–14, the other set projecting in the opposite direction into slots 21 in the other of said four of broaching elements.

The broaching elements 11, 12, 13, and 14 are held together against longitudinal movement and rotation with respect to the shaft 10 by a bullet nose 22, a tail piece 23, and a pair of nuts 24 and 25. The bullet nose 22, which tapers and has longitudinal grooves 26, is threaded on the shaft 10 near one end and abuts one end of the series of broaching elements 11–14, namely, the element 11. The tail piece 23 is mounted on the shaft 10 near the other end and abuts the other end of the series of broaching elements, and key 27 engaging grooves 21 in the broaching element 14. The nuts 24 and 25, which are threaded on the shaft 10, retain the tail piece 23 on the shaft.

The sizing device just described may be pushed or pulled through a long hole in graphite blocks forming the moderator of a nuclear reactor after the coolant tube has been removed from the hole. Passage of the sizing device through the hole in the graphite blocks sizes the hole to receive a new coolant tube, which may be connected to an unshown extension of the present device and installed in the graphite blocks in the same operation that sizes the hole, as shown and described in Frantz et al. Patent 2,983,989, dated May 16, 1961.

The broaching elements 11–14 may be formed of tungsten carbide, and the shaft 10, of steel.

It is also understood that the invention is not to be limited by the details given herein but that it may be modified within the scope of the appended claims.

The embodiments of the invention in which an exclusive property or privilege is claimed are defined as follows:

1. A sizing device comprising a slender shaft, a row of broaching elements loosely fitting the shaft and having spiral cutting portions, the cutting portions spiraling in opposite directions in alternate broaching elements, and locking washers located on the shaft between the broaching elements for keying the elements against rotation with respect to one another.

2. A sizing device comprising a slender shaft, a row of broaching elements loosely fitting the shaft and having spiral cutting portions, the cutting portions spiraling in opposite directions in alternate broaching elements, locking washers located on the shaft between the broaching elements for keying the elements against rotation with respect to one another, and means acting against the shaft and the ends of the row of broaching elements for holding the broaching elements against longitudinal movement with respect to the shaft.

3. A sizing device comprising a slender shaft, a row of broaching elements loosely fitting the shaft except at their ends and having spiral cutting portions extending in opposite directions in alternate broaching elements, and locking washers fitting the shaft between the broaching elements for preventing rotation of the broaching elements with respect to one another, each locking washer having two sets of diametrally opposed keys, the keys of one set extending parallel to the shaft in one direction into engagement with one associated broaching element, the keys of the other set extending parallel to the shaft in the opposite direction into engagement with the other associated broaching element.

4. A sizing device comprising a slender shaft, a row of broaching elements loosely fitting the shaft except at their ends and having spiral cutting portions extending in opposite directions in alternate broaching elements, locking washers fitting the shaft between the broaching elements for preventing rotation of the broaching elements with respect to one another, each locking washer having two sets of diametrally opposed keys, the keys of one set extending parallel to the shaft in one direction into engagement with one associated broaching element, the keys of the other set extending parallel to the shaft in the opposite direction into engagement with the other associated broaching element, and means for holding the broaching elements against longitudinal movement with respect to the shaft.

5. A sizing device comprising a slender shaft, a row of broaching elements loosely fitting the shaft except at their ends and having spiral cutting portions extending in opposite directions in alternate broaching elements, locking washers fitting the shaft between the broaching elements for preventing rotation of the broaching elements with respect to one another, each locking washer having two sets of diametrally opposed keys, the keys of one set extending parallel to the shaft in one direction into engagement with one associated broaching element, the keys of the other set extending parallel to the shaft in the opposite direction into engagement with the other associated broaching element, a bullet nose threaded on the shaft and engaging one end of the row of broaching elements, a tail piece mounted on the shaft and keyed to the other end of the row of broaching elements, and a nut threaded on the shaft in engagement with the tail piece, the bullet nose, tail piece, and nut serving to prevent longitudinal movement and rotation of the row of broaching elements with respect to the shaft.

References Cited by the Examiner

UNITED STATES PATENTS 2,983,989  5/1961  Frantz _____ 29—95.1

References Cited by the Applicant

UNITED STATES PATENTS 2,212,753  8/1940  Smila et al.
2,682,792  7/1954  Donnelly.

OTHER REFERENCES

Railway Mechanical Engineer, March 1943, page 129.

WILLIAM W. DYER, JR., *Primary Examiner.*

H. L. HINSON, *Assistant Examiner.*